United States Patent

Amemiya

[11] 3,837,743
[45] Sept. 24, 1974

[54] DUPLICATION MAGNIFICATION VARIABLE DEVICE FOR USE IN A DUPLICATOR

[75] Inventor: Kinya Amemiya, Tokyo, Japan

[73] Assignee: Konishiroku Photo Industry Co., Ltd., Tokyo, Japan

[22] Filed: Dec. 7, 1972

[21] Appl. No.: 312,791

[30] Foreign Application Priority Data
Dec. 7, 1971    Japan .............................. 46-98318

[52] U.S. Cl. .................. 355/60, 355/57, 355/66
[51] Int. Cl. .................................. G03b 27/32
[58] Field of Search ............ 355/8, 51, 60, 65, 66, 355/57

[56] References Cited
UNITED STATES PATENTS

| | | | |
|---|---|---|---|
| 3,161,107 | 12/1964 | Durst et al. | 355/71 |
| 3,463,585 | 8/1969 | Levine | 355/66 |
| 3,609,024 | 9/1971 | Suzuke | 355/66 X |
| 3,614,222 | 10/1971 | Post et al. | 355/8 |
| 3,656,581 | 4/1972 | Kakii et al. | 355/66 |

*Primary Examiner*—Samuel S. Matthews
*Assistant Examiner*—E. M. O'Connor
*Attorney, Agent, or Firm*—Bierman & Bierman

[57] ABSTRACT

The device comprises a movable mirror which forms part of an optical system, light path changing mirrors adapted to integrate reflected light from the movable mirror, and a lens disposed in a light path and movable therealong. The movable mirror is turned upon switching the operation from non-magnified duplication to varied magnification duplication and vice versa. The lens is moved in conjunction with the motion of the mirror. Variable magnification copying is thereby effected.

7 Claims, 4 Drawing Figures

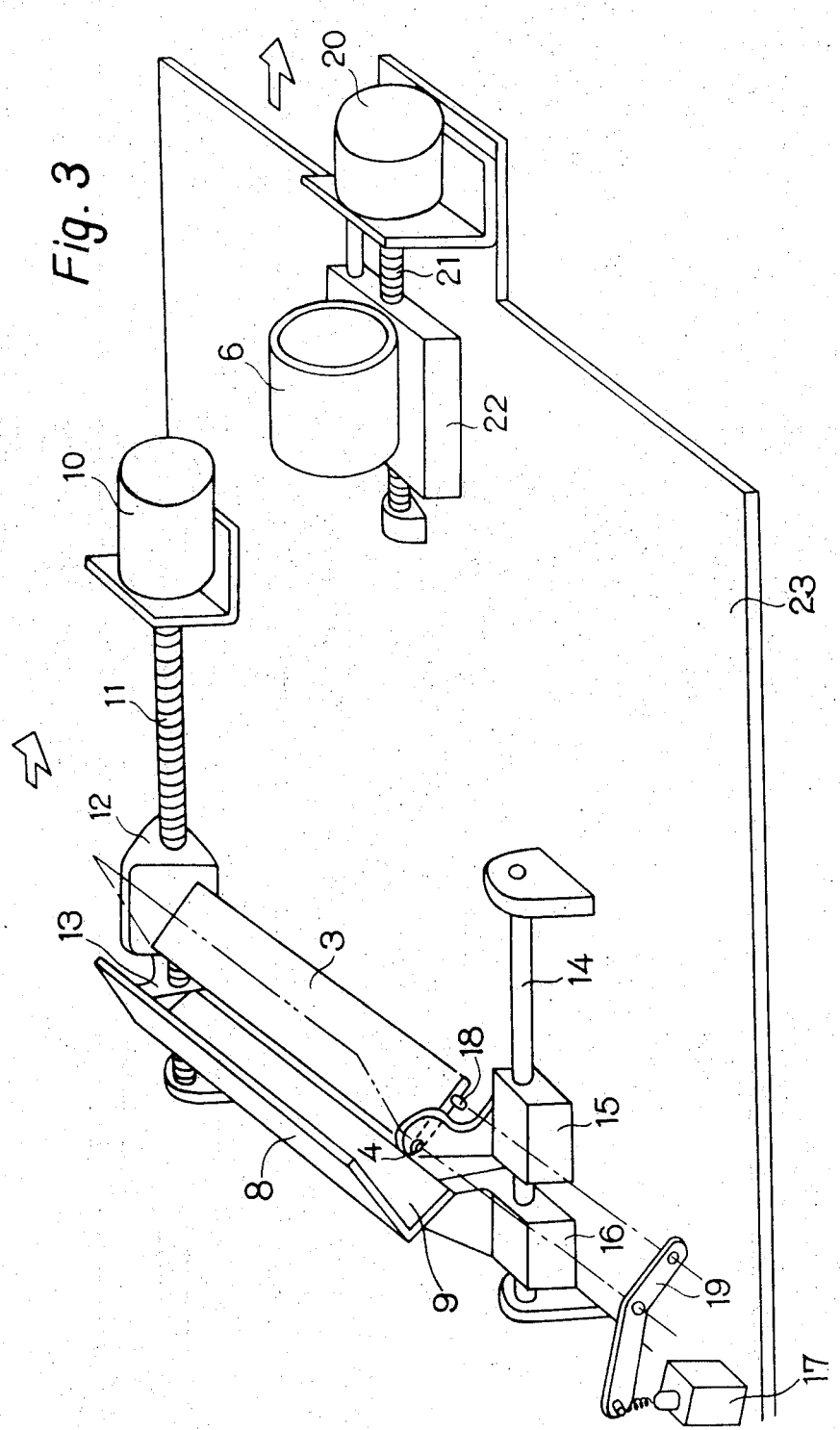

DUPLICATION MAGNIFICATION VARIABLE DEVICE FOR USE IN A DUPLICATOR

This invention relates to a duplication magnification variable device for use in a duplicator.

In the conventionally known duplicator adapted to effect an exposure by means of slit-scanning of the surface of an original, it is not possible to effect non-magnified, reduced and magnified copyings in combination.

Accordingly, an object of the present invention is to provide a duplicator freely effecting either of non-magnified, reduced and magnified copyings simply by operating a switch.

In the attached drawings:

FIG. 3 is a perspective view illustrating a shift of the optical system; and

Figure 1:
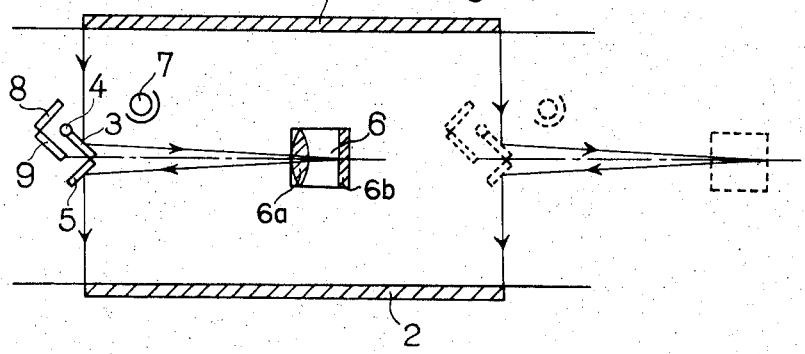
FIG. 1 is a side view showing an arrangement of an optical system for effecting a non-magnified copying.

Now, referring to the accompanying drawings, wherein FIG. 1 is a side view showing an arrangement of an optical system for effecting a non-magnified duplication. Shown at 1 is an original, and 2 is a sensitive paper. Numeral 3 is a mirror adapted to be turned about a pivot upwardly by 90°. 5 is a mirror, 6 is a lens unit comprising a lens 6a and a mirror 6b therebehind, and 7 is a lamp for illuminating the original. In most of drawings, what is shown with the real line illustrates a starting position of an optical system prior to exposure, while the phantom line indicates a position of the optical system after completion of exposure. In effecting a non-magnified copying, it is a known art to shift the optical system between these two positions so as to effect the slit-scanning exposure. Furthermore, integrally movable two mirrors 8 and 9 are provided.

Figure 2:
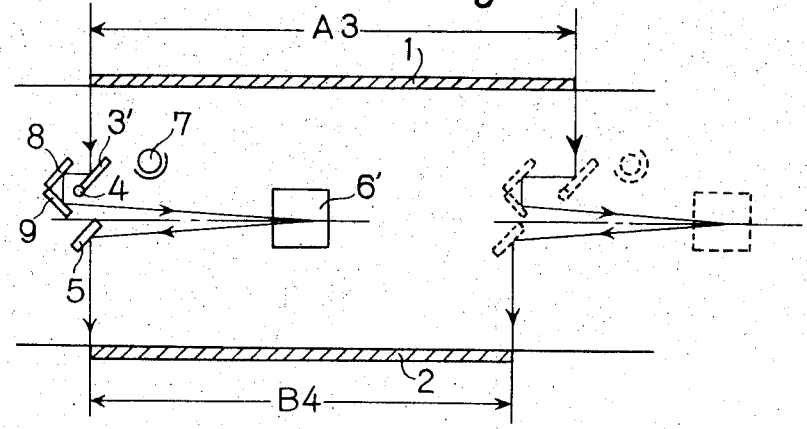
FIG. 2 is a side view of the optical system for effecting a reduced copying.

FIG. 2 is a side view of the optical system in which is shown an embodiment for effecting a reduced copying from an A-3 size (297 mm × 420 mm) original onto a reduced size, for example, a B-4 size (257 mm × 364 mm) sensitive paper. In this embodiment, the mirror 3 of FIG. 1 is pivoted upwardly by 90° to locate its free end at a position 3', and at the same time, a starting position of the lens unit 6 is changed to a position 6'. Thus, a length of light path passing through mirrors 3', 8, 9, and the lens unit 6' and the mirror 5 is maintained constant, and the change of the starting position of the lens unit to the position 6' causes a change in copying magnification. The distance of shift of each component of optical system is such that the mirror 3' is shifted by a distance equal to a longitudinal length of the A-3 size original; the lens unit 6' and the mirror 5 are simultaneously shifted by a distance equal to the longitudinal length of the B-4 size sensitive paper; and mirrors 8 and 9 are simultaneously moved by one half of a total longitudinal length of A-3 and B-4 size sheets. Thus, a length of light path is maintained constant for the duration of slit-scanning exposure.

The mechanism for shifting the optical system is illustrated by one embodiment in FIG. 3. In the drawing, shown at 10 is a motor for shifting mirrors 3, 8 and 9. 11 is a threaded rod for shifting the mirror 3 and the mirrors 8 and 9, which is directly connected to said motor 10 and screw-threaded with two first supporting bases 12 and 13, one supporting base 12 being associated with the mirror 3 and the other supporting base 13 being associated with mirrors 8 and 9. The threaded rod 11 for shifting mirrors is provided with two different leads, so as to be threaded with two first supporting bases 12 and 13 each having a different thread lead. Accordingly, one rotation of said threaded rod 11 causes the mirror 3 and the mirrors 8 and 9 to move at a different rate of speed, the latter 8 and 9 being moved at a speed of one half of that of the former 3. Numeral 14 is a guide rail, while 15 is a second supporting base for the mirror 3 and 16 is another second supporting base for mirrors 8 and 9. The mirror 3 is adapted to be pivoted upwardly by 90° as set forth, the pivotal movement of said mirror being effected by a solenoid. For this purpose, a pin 18 provided at a side portion of free end of mirror 3 is associated with one end of a lever 19 associated with said solenoid 17. 20 is a motor for shifting the lens unit, 21 is a threaded rod for shifting the in-mirror lens, which is directly connected to said motor and screw-threaded with a supporting base 22 for the lens unit. Thus, when a switch (not shown) is operated to change a type of operation from the non-magnified duplication to the reduced duplication, the solenoid is rendered conductive to cause the lever 19, to be attracted to the pin 18. The mirror 3 is caused to turn about the pivot 4 upwardly by 90°, and at the same time, the motor 20 for shifting the lens unit 6 is actuated to move the lens unit 6 from the position of FIG. 1 to that 6' of FIG. 2. Simultaneously when the lens unit 6' reaches the position 6', a microswitch (not shown) is automatically operated to cut off the current flow to the motor 20 for shifting the lens unit. Numeral 23 is a base plate on which all of the optical system are mounted en block, said base plate being adapted to reciprocate by a driving system (not shown). In FIG. 3, the mirror 5 and the lamp for illuminating the original which are shown in FIGS. 1 and 2, are not shown. In effecting the non-magnified copying, both the motor 10 for shifting mirrors and the motor 20 for shifting the in-mirror lens are maintained non-operative, so as to leave these mirrors 3, 8 and 9 and the in-mirror lens 6 at a constant position in relation to the base plate 23. Accordingly, with the base plate 23 being moved by means of the driving system (not shown), the slit-scanning exposure of the surface of the original is effected as in the conventional manner, thereby effecting a non-magnified copying.

In the meantime, by operating the switch (not shown) from the non-magnified copying to the reduced copying, the mirror 3 is turned about the pivot 4 upwardly by 90° to locate its free end at the position 3' and the lens unit 6 is shifted to the position 6' in conjunction with the motion of the mirror, as shown in FIG. 2.

When the base plate 23 is moved by the driving system (not shown), the micro-switch (not shown) is also operated to actuate the motor 10 for shifting mirrors. (In the non-magnified copying, although the micro-switch is maintained in the on-position, the motor 10 for shifting mirrors remains non-operative because of another switch being maintained open.) Rotation of the motor 10 for shifting mirrors causes the mirror 3 and mirrors 8 and 9 to shift in the same direction to the moving direction of the base plate 23. In this case, mirrors 8 and 9 are moved at a speed of one half of that of the mirror 3. The base plate 23 is moved by the distance equal to the longitudinal length of the B-4 size sensitive paper by means of the driving system (not shown). After completion of the slit-scanning exposure, the base plate 23 is caused to return to the initial position, as in the known manner. In conjunction therewith, the mirror 3 and mirrors 8 and 9 are caused to follow the motion of the base plate 23 to be restored to their initial positions, with the mirrors 8 and 9 being moved at a speed of one half to that of the mirror 3.

Figure 4:
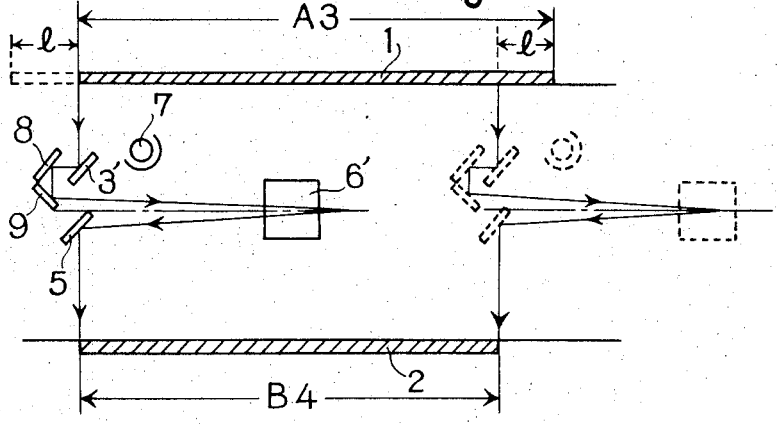
FIG. 4 is a side view of the optical system for effecting a reduced copying according to another embodiment.

FIG. 4 is another embodiment of a duplication magnification variable device in which a reduced copying is effected from an A-3 size original onto a B-4 size sensitive paper. In this embodiment, mirrors 38, 8 and 9, a lens unit 6' being structurally the same as the lens unit 6 and the mirror 5 are shifted in block by the distance equal to the longitudinal length of the B-4 size sensitive paper, while the original sheet 1 is moved in an opposite direction thereto by a distance equal to the difference l in the longitudinal length between the A-3 size sheet and the B-4 size sheet. In this case, means for shifting the mirror 3' and mirrors 8 and 9 is not needed.

In the foregoing passages, non-magnified and reduced copyings are described, and it will be apparent that a magnified copying is easily performable by modifying a design of the optional system.

What we claim is:

1. An exposure device for use in a duplicator adapted to scan an original to be copied and thereby effect exposure by moving an optical focusing system having a plurality of light reflective surfaces, which system comprises a lens and a mirror unit and is movable between and parallel to the surfaces of the original and a light-sensitive paper, both of which are fixed during the exposure, characterized in that the mirror unit comprises a pivotable mirror and a plurality of additional mirrors, the pivotable mirror being pivotable between a first position and a second position, the pivotable mirror and the lens being in a light path between the original and the light sensitive paper, the additional mirrors being in a light path between the lens and the pivotable mirror when such pivotable mirror is in said second position, the lens being shiftable for the purpose of focusing the image from the original on said light-sensitive paper in accordance with the movement of the pivotable mirror from the first position to the second position, the number of light reflecting surfaces in the optical system at the second position of the pivotable mirror being two more than that at the first position of the pivotable mirror.

2. An exposure device according to claim 1, wherein the number of the light reflecting surfaces in the optical system is odd in both the first and second positions of the pivotable mirror.

3. An exposure device according to claim 1, wherein the pivotable mirror is in a light path between the original and the lens.

4. An exposure device according to claim 3, wherein the pivotable mirror is movable a distance equal to the length of the original in the direction of the movement of the optical system, the lens is movable a distance equal to the length of the light-sensitive paper in the direction of the movement of the optical system, and the additional mirrors are movable a distance equal to one-half of the combined total length of the original and the light-sensitive paper in the direction of the movement of the optical system when the pivotable mirror is at the second position.

5. An exposure device according to claim 4, wherein the mirror unit further comprises a fixed mirror in a light path between the lens and the light-sensitive paper, the fixed mirror being movable by a distance equal to the length of the light-sensitive paper in the direction of the movement of the optical system.

6. An exposure device according to claim 1 wherein the pivotable mirror is movable a distance equal to the length of the original in the direction of the movement of the optical system, the lenas is movable a distance equal to the length of the light-sensitive paper in the direction of the movement of the optical system, and the additional mirrors are movable a distance equal to one-half of the combined total length of the original and the light-sensitive paper in the direction of the movement of the optical system when the pivotable mirror is at the second position.

7. An exposure device according to claim 6 wherein the mirror unit further comprises a fixed mirror in a light path between the lens and the light-sensitive paper, the fixed mirror being movable a distance equal to the length of the light-sensitive paper in the direction of the movement of the optical system.

* * * * *